March 6, 1962 F. K. H. NALLINGER 3,023,593
ELASTIC COUPLING
Filed Oct. 27, 1959 3 Sheets-Sheet 1

INVENTOR
FRIEDRICH K. H. NALLINGER

BY Dicke, Craig and Freudenberg
ATTORNEYS

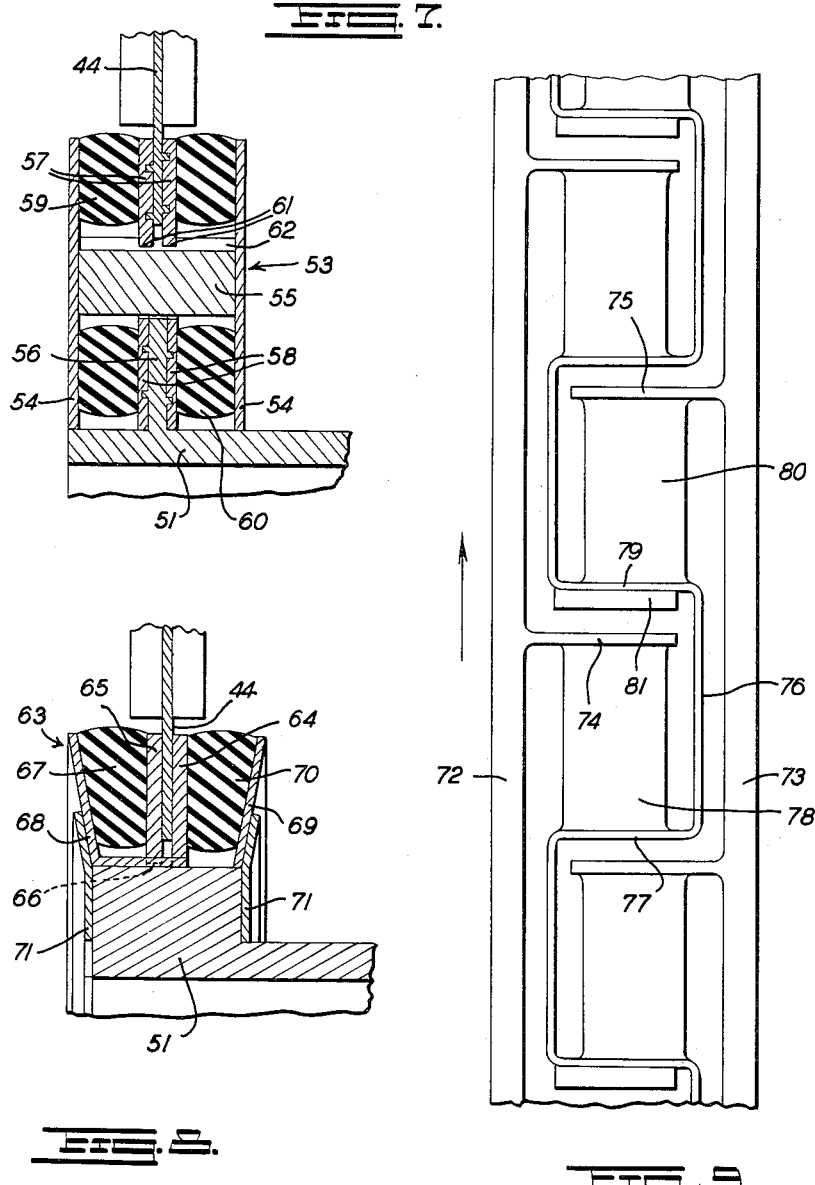

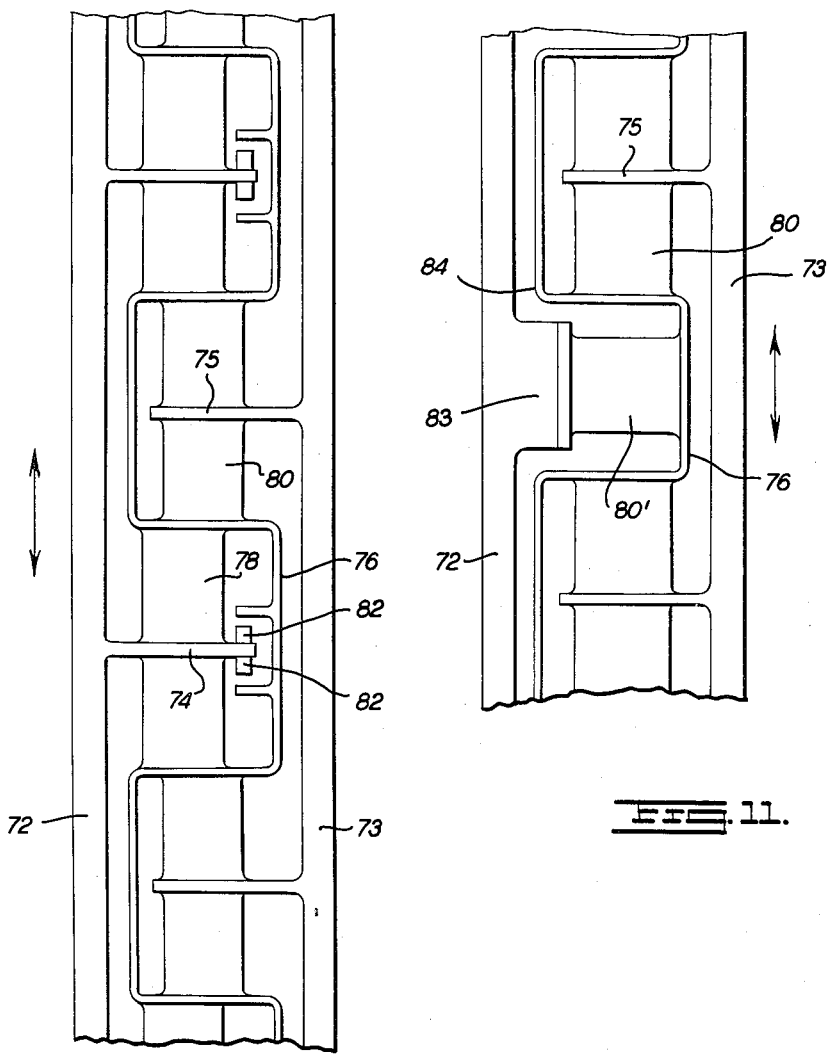

3,023,593
ELASTIC COUPLING
Friedrich K. H. Nallinger, Stuttgart, Germany, assignor to Daimler-Benz Aktiengesellschaft, Stuttgart-Unterturkheim, Germany
Filed Oct. 27, 1959, Ser. No. 849,429
Claims priority, application Germany Nov. 7, 1958
19 Claims. (Cl. 64—27)

The present invention relates to a torsionally elastic element operative as vibration damper or coupling, whereby at least two elastic connections made of rubber or of technically equivalent material and disposed in series behind each other are arranged between the two rigid members intended to be operatively connected with each other by the use of at least one rigid intermediate member. The present invention is of special significance for motor vehicles and, in particular, in connection therewith, again primarily for use of torsionally elastic connections between the clutch and the transmission.

Torsionally elastic elements of the type mentioned hereinabove, broadly speaking, have been known for some time in the prior art. For example, in one prior art construction, each of the two rigid parts to be connected with each other is operatively connected with a rigid intermediate member over a membrane-like elastic body. Both elastic membrane members of such prior art construction, however, have to be selected for the transmission of the maximum torque for which the elastic coupling is intended. Consequently, this prior art arrangement is unsuitable for damping vibration during the transmission of relatively small torques.

The present invention is concerned with the provision of a torsionally elastic element that is capable of absorbing, on the one hand, the full driving torque and, on the other, is capable of effectively damping also driving vibrations with the transmission of smaller torques, for example, during idling of the engine.

The problems underlying the present invention are solved in accordance therewith by utilizing a first elastic connection between a first rigid part and the rigid intermediate part, which has a lesser spring coefficient or spring characteristic against torsion or twisting than the second elastic connection between the rigid intermediate part and the second rigid part, and by enabling bypassing of the first elastic connection through the abutment of the first rigid part at the rigid intermediate part. The term "rigid" is used herein to designate a part which is relatively inelastic as compared to the elastic properties of the elastic connections, such as a cast part, a machined part, or the like.

The torsionally elastic element according to the present invention permits a completely effective vibration damping even with relatively small driving torques, for example, during idling of the engine, by reason of the relatively softer first elastic connection. In case of relatively large driving torques, the first elastic connection is effectively bridged or bypassed by the abutment of the first rigid part at the rigid intermediate part so that any overloading thereof is avoided. Consequently, in case of transmission of relatively large torques, exclusively the relatively harder or stiffer second elastic connection becomes effective so that also with relatively large driving torques the elastic resilience or yieldingness against torsion remains safeguarded to the fullest possible extent.

In order to obtain the different spring coefficient or spring characteristics of the two elastic connections, the same may be made of material having different stiffness or hardness. Furthermore, within the purview of the present invention, the same results may also be achieved by using a different configuration and/or different volumes for the elastic elements and/or different types of loading thereof. The combination of several of the measures mentioned hereinabove to obtain the different spring coefficient or spring characteristics is also possible within the scope of the present invention.

According to a first embodiment of the present invention, the two rigid parts intended to be elastically connected with each other are formed by shaft flanges or the like. In that case, the two rigid parts may be arranged on both sides of the intermediate member and may be constructed as disk-shaped flanges, and may be provided possibly with special engaging parts adapted to engage in the correspondingly shaped intermediate member. The elastic connections themselves may be disposed as disk-shaped members adjacent each other or as annular bodies one about the other. However, each of the elastic connections of either type may consist of individual blocks made of suitable material.

According to another embodiment of the present invention, the different spring coefficients or spring characteristics are achieved by the fact that the elastic bodies of both elastic connections are loaded in a different manner. For example, it is possible, according to the present invention, to construct the first relatively soft elastic connection of body members subjected during operation to shearing loads or stresses, whereas the same rubber bodies are so assembled for the second, relatively harder elastic connection that they are subjected to tension or pressure loads or stresses.

As already mentioned hereinabove, a torsionally elastic element according to the present invention finds particuuar useful application in motor vehicles between the clutch and transmission thereof. In connection therewith, one of the rigid parts may be formed directly by a friction clutch disk of any known construction, for example, of a single disk clutch, whereas the other rigid parts may consist of the hub portion coordinated to or operatively connected with this friction clutch disk. In that case, the torsionally elastic element is directly built into the construction of a motor vehicle clutch.

The clutch disks, i.e. one of the rigid parts, is thereby surrounded on both sides thereof by an intermediate member. The intermediate member is constructed of annular shape and has an essentially U-shaped or H-shaped cross-section. Both elastic connections may be arranged essentially symmetrically with respect to the clutch disk carrying the friction linings.

Accordingly, it is an object of the present invention to provide a torsionally elastic coupling between two rigid parts which is adapted to transmit the maximum driving torque while, at the same time, effectively absorbing vibrations, regardless of the magnitude of the torque transmitted therethrough.

Another object of the present invention resides in the provision of two, series-connected elastic connections disposed, on the one hand, between a first part and an intermediate member, and, on the other, between the intermediate member and the second part which are so constructed and arranged as to provide a relatively soft elastic connection to effectively absorb vibrations with the transmission of relatively small torques and to provide an effective bypass of this first elastic connection so as to offer the relatively stiffer spring characteristic of the second elastic connection in case of transmission of relatively larger torques.

Still another object of the present invention resides in the provision of a torsionally elastic coupling, particularly for use between the clutch and transmission of a motor vehicle, which may be readily installed and combined with the friction clutch thereof.

Another object of the present invention resides in the provision of a torsionally elastic coupling between two relatively rigid parts intended to be connected with each other for rotation in unison with each other which is capable of offering suitable elastic characteristics regardless of the torque transmitted at any instant by the coupling.

These and other objects, features and advantages of the present invention will become more obvious from the following description, when taken in connection with the accompanying drawing which shows, for purposes of illustration only, several embodiments in accordance with the present invention and wherein.

Figure 6:
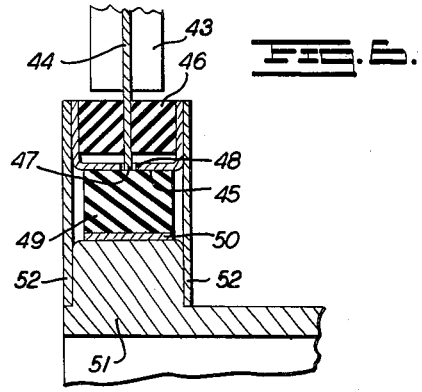

FIGURES 6 through 8 are partial cross-sectional views through three further embodiments of an elastic coupling, in accordance with the present invention, combined with the main clutch of the motor vehicle, and FIGURES 9 through 11 are partial views of three further embodiments of elastic couplings in accordance with the present invention, whereby the circular elastic couplings are shown as developed projections in the plane of the drawing in these figures.

Figure 1:
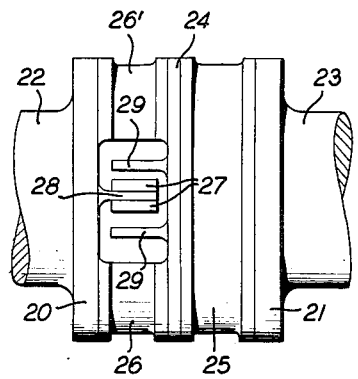
FIGURE 1 is a side elevational view of a first embodiment of a torsionally elastic coupling in accordance with the present invention.

Referring now to the drawing, wherein like reference numerals are used throughout the various views to designate like parts, and more particularly to FIGURE 1, a disk member 24 constituting the intermediate rigid member is arranged between the flange-shaped ends 20 and 21 of the shafts 22 and 23, constituting the rigid parts to be elastically connected with each other. The flange-like disk member 21 is connected with the intermediate member 24 by means of a disk-shaped elastic body 25 made of rubber or of technically equivalent material. The connection may thereby take place in any suitable manner, for example, by bonding, cementing, gluing, or the like. The elastic body 25 serves for the transmission of the full driving torque and, consequently, has a correspondingly greater hardness or relatively smaller elasticity selected to accommodate safely this relatively large driving torque. It is understood, however, that the elastic body 25 may consist of individual blocks of elastic material as is also the case with all the elastic bodies of the other embodiments.

Two segment-shaped elastic bodies 26 and 26' are arranged between the flange-shaped disk 20 and the intermediate member 24. The elastic bodies 26 and 26' have a lesser volume than the body 25 and possibly are also made of softer material. Bumpers or buffers 27 made of elastic material and serving as abutments are disposed between the elastic bodies 26 and 26'. The buffers 27 are secured at a rigid projection 28 forming part of or suitably secured to the flange-shaped disk member 20. The buffers 27 extend thereby into the space between projections 29 suitably arranged at the intermediate disk member 24. However, several units of elastic blocks 27 and abutments 29 may be provided along the periphery of the elastic coupling. Furthermore, rigid, i.e. non-elastic abutments could also be used in accordance with the present invention.

*Operation*

The operation of the elastic coupling of FIGURE 1 is as follows: In the course of the transmission, from shaft 22 to shaft 23, of relatively smaller driving torques, for example, during idling of the driving engine, the elastic bodies 26 and 26' are rendered effectively operative, as the relatively small torques merely affect the relatively softer elastic bodies which are thereby stressed in torsion while the relatively stiffer elastic connection 25 remains unaffected. Consequently, the elastic bodies 26 and 26' assure a satisfactory and good vibration damping. As soon as the driving torque exceeds a predetermined value, the rubber buffers 27 abut against the projections 29 of the intermediate member 24, since the elastic bodies are now torsionally stressed by an amount in excess of that permissive by the spacing of elements 27, 28 and 29. As a result thereof, the elastic bodies 26 and 26' are effectively bridged or bypassed, i.e. are rendered ineffective insofar as the transmission of torque is concerned. The transmission of torque now takes place exclusively by means of the elastic member or body 25 to the shaft 23. The full torque is, therefore, absorbed by the relatively hard or stiff elastic body 25.

Figure 2:
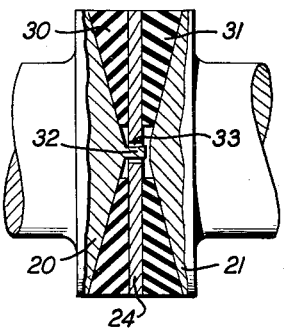
FIGURE 2 is a second embodiment, partly in cross-section, of a torsionally elastic coupling in accordance with the present invention.

FIGURE 2 illustrates an arrangement essentially similar in principle to that of FIGURE 1 in which the disk-shaped shaft flanges 20 and 21 are constructed of truncated conical shape at the mutually facing surfaces thereof. Elastic bodies 30 and 31 are arranged between these surfaces and the intermediate rigid disk member 24. The elastic bodies 30 and 31 are identical as to shape and volume. The different spring effect thereof is achieved, in FIGURE 2, by reason of the fact that the elastic body 31 is made of a material having a considerably greater stiffness than the elastic body 30. A pin member 32 at the disk-shaped shaft flange 20 serves as abutment which extends into an aperture 33 provided in the intermediate disk 24.

Figure 3:
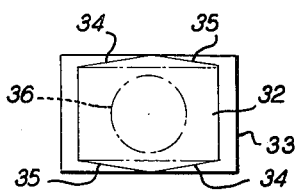
FIGURE 3 is an enlarged elevational view of the abutment of FIGURE 2.

FIGURE 3 shows the hexagonal cross-section of the pin member 32 so that, during rotation with respect to the intermediate disk member 24, the pin 32 abuts against the inside of aperture 33 not only with the corners thereof but with the surfaces 34 for one direction of rotation or with the surfaces 35 for the other direction of rotation thereof. Of course, a construction of the pin member 32 with rectangular or quadrangular cross-section is also possible. The pin member 32 may also be extended directly up to the other disk member 21 and may serve therewith simultaneously as axial support of the two disks 20 and 21 with respect to each other. In order to construct this axial support essentially frictionless, or as frictionless as possible, a ball 36 accommodated in a correspondingly-shaped bearing socket may also be inserted between the pin member 32 and the disk member 21.

Figure 4:
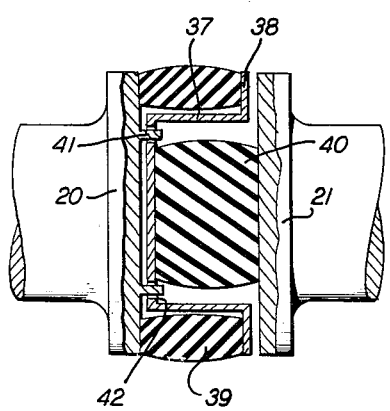
FIGURE 4 is a side elevational view, partly in cross-section, of still another embodiment of a torsionally elastic coupling in accordance with the present invention.
Figure 5:
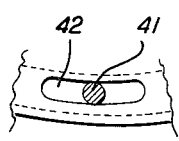
FIGURE 5 is a partial elevational view, on an enlarged scale, of an abutment of the elastic coupling of FIGURE 4.

According to FIGURE 4, an essentially pot- or cup-shaped intermediate member 37 is effectively inserted between the disk-shaped shaft flanges 20 and 21 which is provided on the outside thereof with a peripheral flange 38. The elastic body 39 for the first elastic connection is arranged between flange 38 and the disk member 20. The elastic body 39 is arranged concentrically about the elastic body 40 for the second elastic connection which is arranged between the disk member 21 and the bottom of the pot- or cup-shaped intermediate member 37. Abutments 41 which, as illustrated in FIGURE 5, are constructed as pins or the like extend into apertures 42 of the intermediate member 37.

The outer elastic body 39 in that case may also be composed of several individual, for example, segment-shaped pieces. The insertion of axial support means, for example, between the bottom of the pot-shaped intermediate member 37 and the disk member 20 and/or between the outer flange 38 and the disk member 21 is also possible in this embodiment and may be made by any suitable anti-friction means of known construction, for instance, analogous to ball 36 of FIGURE 3. Furthermore, the second, relatively hard elastic connection may be arranged on the outside and the first elastic relatively soft connection may be arranged therewithin. In that case, the flange 38 may be used also to form the abutments for engagement into the disk 21 or vice versa.

The several, torsionally elastic elements described hereinabove so far were constructed as elastic shaft coupling which possibly could also be used for angularly movable shaft couplings. In the following embodiments, the torsionally elastic coupling forms a part of the motor vehicle main clutch.

FIGURE 6 illustrates a clutch disk 44 of known construction and provided with friction linings 43 which is arranged approximately symmetrically with respect to an annularly-shaped intermediate member 45 having an essentially U-shaped cross-section, open in the outward direction. Elastic bodies 46 of the first elastic connection are arranged between the clutch disk 44 and the leg portions of the U-shaped intermediate member 45 which elastic bodies 46 may consist of rings closed upon themselves, i.e., endless rings, or, for example, of segment-shaped individual pieces. The disk member 44 engages with the pin-like projections 47 thereof provided along the inner circumference thereof into apertures 48 provided in the intermediate member 45 and forms thereby the abutment for effectively bridging or bypassing the first elastic connection.

A sleeve-like elastic body 49 of relatively harder material is secured, for example, by bonding, vulcanizing, or the like at the intermediate member 45 which serves as second elastic connection. The inner sleeve 50 of the elastic body 49 is non-rotatably secured at the hub portion 51 coordinated to the clutch disk 44. In order to achieve an improved axial rigidity, disks 52 are secured at the hub portion 51, for example, are threadably secured thereat which laterally guide the U-shaped intermediate member 45 and abut against the outside of the leg portions of the U-shaped intermediate member 45. Additionally, the disks 52 may serve as auxiliary friction damping devices.

*Operation*

The operation of the coupling illustrated in FIGURE 6 is the same in principle as that described hereinabove for the other embodiments. During idling, i.e. during the transmission of relatively small torques, the elastic body 46 of the first elastic connection is effectively rendered operative. The elastic body 46 thereby elastically absorbs the torque and damps the rotary vibrations. Upon exceeding a predetermined torque within the elastic clutch coupling, the abutments 47 and apertures 48 abut against each other, thereby bridging the first elastic connection 46, and the full torque is now absorbed by the elastic body 49 of the second elastic connection.

FIGURE 7 illustrates a similar construction provided with an annularly-shaped intermediate member 53 having an essentially H-shaped cross-section. The intermediate member 53 consists essentially of the lateral annular disks 54 and of the center ring or annular member 55 or corresponding circumferentially distributed spacer members. The clutch disk 44 and a radial flange 56 provided at the hub portion 51 each engage approximately symmetrically between the leg portions of the H-shaped intermediate member 53. The elastic bodies 59 and 60 are secured thereat by means of special disks 57 and 58, respectively. The elastic bodies 59 serve for the purpose of the first elastic connection and consist of relatively soft elastic material, whereas the bodies 60 of the second elastic connection are made of relatively hard or stiffer elastic material. Both elastic bodies 59 and 60 may be constructed as annular members closed upon themselves, i.e. endless annular members, or may also be composed of individual segments. The disks 57 engage along the inner circumference with the projections 61 thereof into corresponding grooves 62 of the center ring 55 at the intermediate member 53 and thereby constitute the abutments for effectively bridging or bypassing the elastic bodies 59. The operation of this arrangement corresponds to that of FIGURE 6.

In the embodiment of FIGURE 8, the intermediate member, generally designated by reference numeral 63, is rotatably supported on an annular extension of the hub portion 51 and is constructed as an annular part of essentially H-shaped cross-section, whereby, for reasons of manufacture and assembly, the ring forming the leg portion 64 is combined with the angularly-shaped annular part 68 only during assembly thereof. The clutch disk 44 is rigidly connected with disk member 65 which, with the abutments 66 thereof, engages into the part 68 of the intermediate member 63. The elastic body 67 of the first elastic connection is arranged between the disk member 65 and the outer leg portion of the U-shaped intermediate member 63.

The disk member 64 of the intermediate member 63 which directly abuts at the clutch disk 44 but which is not secured thereto is operatively connected with an outer disk member 69 by means of the second elastic connection constituted by the elastic body 70. The disk member 69 is non-rotatably secured in any suitable manner on the extension of the hub part 51. External disk members 71 are secured at the hub extension, for example, by means of threaded connections, and serve for the axial guidance of the intermediate member 63 and therewith also of the clutch disk 44. In connection therewith, the elastic bodies 67 and 70, as well as the corresponding elements of the other embodiments of the present invention, may be pre-stressed axially and/or radially.

The operation of the embodiment according to FIGURE 8 corresponds to that of the preceding embodiments.

In the embodiments described hereinabove, essentially disk- or sleeve-shaped shaft flanges or intermediate members were provided. The elastic bodies used in connection therewith were subjected essentially to shearing or torsional loads. However, it is also within the purview of the present invention to utilize elastic bodies which are subjected to tension or compression loads.

For example, in the embodiments of FIGURE 9, axial projections 74 and 75 are arranged at the rigid parts 72 and 73 intended to be connected with each other. FIGURE 9, as well as FIGURES 10 and 11, thereby illustrate developed projections within the plane of the drawing for the actually cylindrical or circumferential construction of the elastic coupling in accordance with the present invention.

The intermediate member 76 is constructed in the manner of a meander strip into which the projections 74 and 75 alternately engage. The elastic bodies 78 of the first elastic connection are arranged between the projections 74 and the axially extending portions 77 of the intermediate member 76. The elastic bodies 80 of the second elastic connection are secured between the projections 75 and the other axially extending portions 79 of the intermediate member 76. The elastic bodies 78 are made of relatively soft, elastic material and the other elastic bodies 80, in contrast thereto, of relatively hard, elastic material. Elastic abutment bumpers or buffer members 81 are provided on the rear side of the axially extending portions 79. In case of transmission of torque in the direction of the arrow, whereby it should be noted that the arrangement illustrated in FIGURE 9 is effective only for the transmission of torque in that direction of rotation, at first the relatively soft elastic bodies 78 are subjected to tensional loads with corresponding vibration-damping action. Upon abutment of the axially extending portions 74 at the buffers 81, the first elastic connection is effectively bridged or bypassed, and the transmission of torque takes place now through the relatively hard elastic bodies 80 which are now subjected to compressional loads.

A similar arrangement which, however, is effective in both directions of rotation is illustrated in FIGURE 10. The axial projections 74 and 75 thereof are provided in the center of the corresponding sections of the meander-like intermediate member 76. The projections 74 and 75 are connected on both sides thereof by means of relatively soft or hard elastic bodies 78 and 80, respectively, with the axially extending portions of the intermediate member 76. Abutments 82 serve for purposes of bridging the relatively soft elastic body 78.

The operation of the embodiment of FIGURE 10 is the same as that described in connection with FIGURE 9; however, half of the elastic bodies of each connection are now subjected to tensional loads, and the other half are subjected to compression loads. This manner of loading thereby reverses in case of reversal of the direction of rotation.

The preceding embodiments utilize, for the two elastic connections thereof, elastic bodies of different materials and possibly also of different configuration and/or volume. Since it is known that, for example, rubber offers different spring coefficients or spring characteristics with different types of loads, the same end, i.e. of different spring characteristics may also be achieved with similarly shaped rubber parts of the same material by subjecting the same to different types of loads.

Such an arrangement is illustrated in FIGURE 11. In this embodiment, projections 75 extending axially from the part 73, engage, in the manner already described hereinabove, into the intermediate member 76 and are operatively connected with the elastic bodies 80 of the second elastic connection which are subjected to tensional or compression loads. Plate-shaped or segment-shaped projections 83 are arranged at the part 72 which serve as abutment with respect to the edges 84 of the intermediate member 76. Similar rubber bodies 80', which are of identical shape and material as bodies 80, are arranged axially parallel on projections 83 and are also connected therewith as well as with the intermediate member 76. In case of relative rotation, the rubber bodies 80' are subjected to shearing loads. Consequently, the spring characteristics offered thereby are relatively soft and effective with small torques. As soon as the projections 83 abut against the intermediate member 76, i.e. against the edge portions 84 thereof, the transmission of torque takes place through the elastic bodies 80 which are now subjected to tension and compression. The arrangement is thereby effected in both directions of rotation.

While I have shown and described several embodiments in accordance with the present invention, it is understood that the same is not limited thereto but is susceptible of many changes and modifications. For example, the individual features of the various embodiments may be interchanged or combined with each other in any suitable manner. For instance, within the purview of the present invention is also a construction of a clutch disk for the main clutch of a motor vehicle constructed according to the principle of the embodiments of FIGURE 10 or 11. Thus, it is obvious that the present invention is not limited to the details shown and described herein, but is susceptible of many modifications within the spirit and the scope of the present invention and I, therefore, do not wish to be limited to the details shown and described herein but intend to cover all such changes and modifications as are encompassed by the scope of the appended claims.

I claim:

1. A torsionally elastic coupling operative as vibration damper comprising a first relatively rigid part, a second relatively rigid part, a relatively rigid intermediate part, connecting means elastically connecting said first part with said second part, including, in series, first elastic connecting means operatively connecting said first part with said intermediate part and second elastic connecting means operatively connecting said intermediate part with said second part, one of said elastic connecting means having a smaller spring value as regards twisting than the other elastic connecting means, and means effectively bridging said one elastic connecting means having said smaller spring value as regards twisting as the torque transmitted through said coupling exceeds a predetermined amount.

2. A torsionally elastic coupling according to claim 1, wherein said first and second elastic connecting means are operatively connected with the respective rigid part thereof to subject the same to different stress loads and to thereby obtain the different spring characteristics thereof.

3. A torsionally elastic element operative as vibration damper and coupling of a disengageable clutch having a clutch disk member and a hub portion, especially for motor vehicles, comprising said clutch disk member, said hub portion, a relatively rigid intermediate part, first elastic connecting means operatively connecting said clutch disk member with said intermediate part, second elastic connecting means operatively connecting said intermediate part with said hub portion, said first and second elastic connecting means being effectively connected in series, one of said elastic connecting means having a smaller spring coefficient against twisting than the other elastic connecting means, and means effectively bridging said one elastic connecting means when the torque transmitted through said elastic element exceeds a predetermined amount.

4. A torsionally elastic element operative as vibration damper and coupling, especially for motor vehicles, comprising a first relatively rigid part, a second relatively rigid part, a relatively rigid annulary-shaped intermediate part surrounding one of said two parts on both sides thereof, first elastic connecting means operatively connecting said first part with said intermediate part, second elastic connecting means operatively connecting said intermediate part with said second part, said first and second elastic connecting means being effectively connected in series, one of said elastic connecting means providing a smaller spring coefficient against twisting than the other elastic connecting means, and means effectively bridging said one elastic connecting means with the torque transmitted through said elastic element exceeding a predetermined amount.

5. A torsionally elastic element according to claim 4, wherein said last-mentioned means includes an abutment means on the one of said rigid parts connected by said one elastic connecting means so constructed and arranged as to abut against said intermediate part when the torque transmitted through said elastic element exceeds a predetermined amount.

6. A torsionally elastic element according to claim 5, wherein said intermediate part is of essentially U-shaped cross-section having leg portions, and wherein said elastic connecting means are arranged on the inside of said leg portions.

7. A torsionally elastic element according to claim 5, wherein said intermediate part is of essentially H-shaped cross-section including leg portions and wherein said elastic connecting means are arranged on the outside of said leg portions.

8. A torsionally elastic element according to claim 5, wherein said intermediate part is provided with leg portions, one of said first and second rigid parts forming a hub portion, and disk means secured to said hub portion on both sides of said intermediate part for axially guiding said intermediate part by the abutment thereof at said leg portions.

9. A torsionally elastic element according to claim 4, wherein said intermediate part includes leg portions, and wherein at least one of said first and second rigid parts extends essentially symmetrically between said leg portions.

10. A torsionally elastic element according to claim 4, wherein said intermediate part includes leg portions, and guide means secured to one of said first and second rigid parts for axially guiding said intermediate part at the leg portions thereof.

11. A torsionally elastic coupling operative as a vibration dampener comprising a first relatively rigid part, a second relatively rigid part, a relatively rigid intermediate part, a respective one of said first and second rigid parts being arranged on each side of said intermediate part, connecting means elastically connecting said first rigid part with said second rigid part, including, in series, first elastic connecting means operatively connecting said first part with said intermediate part and second elastic connecting means operatively connecting said intermediate part with said second part, one of said elastic connecting means having a smaller spring value as regards twisting than the other elastic connecting means, and means effectively bridging said one elastic connecting means having said smaller spring valve as regards twisting as the torque transmitted through said coupling exceeds a predetermined amount, including projecting means on the one of said rigid parts connected by said one elastic connecting means and correspondingly-shaped aperture means provided in said intermediate part, said projecting means being so constructed and arranged as to engage within said aperture means to thereby effectively bridge said one elastic connecting means.

12. A torsionally elastic element according to claim 11, wherein first and second rigid parts are disk-shaped flange members of truncated conical shape at the mutually facing surfaces thereof, and wherein said elastic connecting means are correspondingly shaped, one of said elastic connecting means being arranged between each of said mutualy facing surfaces and the intermediate rigid part.

13. A torsionally elastic element according to claim 12, wherein said intermediate part is a cup-shaped member having an outer flange portion, and wherein one of said first and second connecting means is arranged between a respective rigid part and said outer flange portion, and the other one of said first and second connecting means is arranged between a respective flange member and the bottom portion of said cup-shaped member.

14. A torsionally elastic coupling operative as vibration damper comprising a first relatively rigid part, a second relatively rigid part, a relatively rigid intermediate part, connecting means elastically connecting said first part with said second part, including, in series, first elastic connecting means operatively connecting said first part with said intermediate part and second elastic connecting means operatively connecting said intermediate part with said second part, one of said elastic connecting means having a small spring value as regards twisting than the other elastic connecting means, and means effectively bridging said one elastic connecting means as the torque transmitted through said coupling exceeds a predetermined amount, said intermediate part and said first part being radially guided with respect to the second part.

15. A torsionally elastic coupling according to claim 1, wherein said bridging means includes rigid projecting means on said first part engaging with said intermediate part when the torque transmitted through said coupling exceeds said predetermined limit, and resilient buffer means secured to one of the two parts consisting of said projecting means and said intermediate part for cushioning said engagement therebetween.

16. A torsionally elastic coupling according to claim 1, wherein each of said first and second rigid parts includes projections arranged about the circumference thereof extending outwardly in the direction of the other of said first and second parts, said intermediate part being constructed as a meander strip into which said projections alternately engage, and wherein each of said elastic connecting means is composed of individual elastic elements connected between the projections on a respective one of said first and second rigid parts and said meander strip.

17. A torsionally elastic coupling according to claim 16, wherein the elastic elements forming said elastic connecting means are alternately arranged in the circumferential direction in such a manner that the elements forming said one elastic connecting means having said smaller spring value are under tension stresses and the elements forming the other of said elastic connecting means are under compression stresses.

18. A torsionally elastic coupling according to claim 16, wherein the elastic elements forming said elastic connecting means having the smaller spring value are arranged on both sides of the projections extending outwardly from said first part, and said elastic elements forming the other of said elastic connecting means are arranged on both sides of the projections extending outwardly from said second part.

19. A torsionally elastic coupling according to claim 16, wherein the elements forming said one elastic connecting means having said small spring value are arranged axially parallel on the projections on said first rigid part and are connected to such projections on said first rigid part and to said meander strip so as to be subjected to shearing stresses, and wherein the elements forming the other of said elastic coupling means are circumferentially arranged on the projections on said second part and are connected to said projections on said second part and to said meander strip so as to be subjected to tension and compression stresses.

References Cited in the file of this patent

UNITED STATES PATENTS

| | | |
|---|---|---|
| 2,127,942 | Schmidt | Aug. 23, 1938 |
| 2,846,856 | Hagenlocher | Aug. 12, 1958 |
| 2,910,843 | Happ et al. | Nov. 3, 1959 |

FOREIGN PATENTS

| | | |
|---|---|---|
| 479,638 | Great Britain | Feb. 9, 1938 |
| 532,393 | Great Britain | Jan. 23, 1941 |
| 546,487 | Great Britain | July 15, 1942 |
| 622,147 | Great Britain | Apr. 27, 1959 |